(12) United States Patent
Yoshida

(10) Patent No.: US 7,607,579 B2
(45) Date of Patent: Oct. 27, 2009

(54) INFORMATION PROCESSING APPARATUS

(75) Inventor: Kenji Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 11/977,073

(22) Filed: Oct. 23, 2007

(65) Prior Publication Data
US 2008/0093450 A1    Apr. 24, 2008

(30) Foreign Application Priority Data
Oct. 23, 2006   (JP)   .............................. 2006-287216

(51) Int. Cl.
| | |
|---|---|
| G06K 7/08 | (2006.01) |
| G06K 19/06 | (2006.01) |
| G06K 17/00 | (2006.01) |
| H05K 7/10 | (2006.01) |
| G06F 13/00 | (2006.01) |
| G06F 13/28 | (2006.01) |

(52) U.S. Cl. .................. 235/435; 235/375; 235/380; 235/451; 235/492; 375/225; 710/36; 710/48; 710/301; 711/115; 711/167; 711/170; 711/171; 711/172

(58) Field of Classification Search ................. 235/375, 235/380, 435, 451, 492; 375/225; 710/36, 710/48, 301; 711/115, 162, 170–172
See application file for complete search history.

(56) References Cited

U.S. PATENT DOCUMENTS

| | | | |
|---|---|---|---|
| 6,397,284 B1 * | 5/2002 | Sleeman et al. ............. | 710/266 |
| 7,360,001 B2 * | 4/2008 | Tashiro ....................... | 710/72 |
| 2005/0033917 A1 * | 2/2005 | Takeuchi ..................... | 711/115 |
| 2005/0182881 A1 * | 8/2005 | Chou et al. .................. | 710/301 |
| 2007/0215701 A1 * | 9/2007 | Takimoto .................... | 235/435 |

FOREIGN PATENT DOCUMENTS

JP    2004-355476    12/2004

* cited by examiner

*Primary Examiner*—Thien M. Le
*Assistant Examiner*—Tuyen K Vo
(74) *Attorney, Agent, or Firm*—Nutter McClennen & Fish LLP; John J. Penny, Jr.

(57) ABSTRACT

The invention provides an information processing apparatus that includes: a card slot in which a card-type medium is inserted; and a data communication unit that performs data exchange with the card-type medium in an operation mode that is judged as the faster mode that offers a faster data exchange with the card-type medium, which is either a first operation mode or a second operation mode.

11 Claims, 9 Drawing Sheets

FIG. 5

| CYCLE TIME |
|---|
| 250 ns |
| (150 ns) |
| 120 ns |
| 100 ns |
| 80 ns |

CYCLE TIME IN MEMORY MODE

FIG. 6

| PIO MODE | CYCLE TIME |
|---|---|
| PIO MODE 0 | 600 ns |
| PIO MODE 1 | 383 ns |
| PIO MODE 2 | 240 ns |
| PIO MODE 3 | 180 ns |
| PIO MODE 4 | 120 ns |
| PIO MODE 5 | 100 ns |
| PIO MODE 6 | 80 ns |

CYCLE TIME IN PIO MODE OF True IDE MODE

FIG. 7

TB10: MODE SELECTION LOOKUP TABLE
(MULTIPLE COMMAND NOT SUPPORTED)

|  | PIO MODE | PIO MODE 1 | PIO MODE 2 | PIO MODE 3 | PIO MODE 4 | PIO MODE 5 | PIO MODE 6 |
|---|---|---|---|---|---|---|---|
| 250 ns | MEMORY | MEMORY | True IDE | True IDE | True IDE | True IDE | True IDE |
| 150 ns | MEMORY | MEMORY | MEMORY | True IDE | True IDE | True IDE | True IDE |
| 120 ns | MEMORY | MEMORY | MEMORY | MEMORY | True IDE | True IDE | True IDE |
| 100 ns | MEMORY | MEMORY | MEMORY | MEMORY | MEMORY | True IDE | True IDE |
| 80 ns | MEMORY | MEMORY | MEMORY | MEMORY | MEMORY | MEMORY | True IDE |

FIG. 8

TB20: MODE SELECTION LOOKUP TABLE
(MAXIMUM NUMBER OF SECTORS: 2)

|  | PIO MODE 0 | PIO MODE 1 | PIO MODE 2 | PIO MODE 3 | PIO MODE 4 | PIO MODE 5 | PIO MODE 6 |
|---|---|---|---|---|---|---|---|
| 250 ns | MEMORY | MEMORY | True IDE | True IDE | True IDE | True IDE | True IDE |
| 150 ns | MEMORY | MEMORY | MEMORY | True IDE | True IDE | True IDE | True IDE |
| 120 ns | MEMORY | MEMORY | MEMORY | MEMORY | True IDE | True IDE | True IDE |
| 100 ns | MEMORY | MEMORY | MEMORY | MEMORY | True IDE | True IDE | True IDE |
| 80 ns | MEMORY | MEMORY | MEMORY | MEMORY | MEMORY | True IDE | True IDE |

TB30: MODE SELECTION LOOKUP TABLE
(MAXIMUM NUMBER OF SECTORS: 4)

FIG. 10

TB40: MODE SELECTION LOOKUP TABLE
(MAXIMUM NUMBER OF SECTORS: 8)

| | PIO MODE 0 | PIO MODE 1 | PIO MODE 2 | PIO MODE 3 | PIO MODE 4 | PIO MODE 5 | PIO MODE 6 |
|---|---|---|---|---|---|---|---|
| 250 ns | MEMORY | True IDE | True IDE | True IDE | True IDE | True IDE | True IDE |
| 150 ns | MEMORY | MEMORY | True IDE | True IDE | True IDE | True IDE | True IDE |
| 120 ns | MEMORY | MEMORY | MEMORY | True IDE | True IDE | True IDE | True IDE |
| 100 ns | MEMORY | MEMORY | MEMORY | MEMORY | True IDE | True IDE | True IDE |
| 80 ns | MEMORY | MEMORY | MEMORY | MEMORY | True IDE | True IDE | True IDE |

INFORMATION PROCESSING APPARATUS

Priority is claimed under 35 U.S.C. §119 to Japanese Patent Application No. 2006-287216, filed Oct. 23, 2006, the entire disclosure of which is expressly incorporated by reference herein.

BACKGROUND

1. Technical Field

The present invention relates to an information processing apparatus, and more particularly to an information processing apparatus that is capable of selecting one suitable operation mode when there is a plurality of operation modes in which the apparatus can perform data exchange with a card-type medium.

2. Related Art

A known example of various kinds of card-type media that allow an information processing apparatus such as a personal computer to store data and/or conduct data communication is a CF (Compact Flash) (Registered Trademark) card. A CF-card-compatible information processing apparatus is provided with a card slot that accepts a CF card. A CF card becomes accessible by an information processing apparatus when a user inserts the CF card into the card slot of the information processing apparatus.

There are two types of the CF card: a memory card and an I/O card. When an information processing apparatus performs data exchange with a memory-card-type CF card inserted in the card slot thereof, it is necessary for the information processing apparatus to perform data exchange therewith in one of two operation modes, which is a memory mode or a True IDE mode. The information processing apparatus can make a discretionary decision as to whether to choose the memory mode or the True IDE mode for performing data communication with the CF card. According to a known conventional approach, the information processing apparatus inspects (i.e., checks, or confirms) the operation mode(s) with which the inserted CF card is compatible, and the information processing apparatus makes access to the CF card in the True IDE mode if it is compatible with the True IDE mode, and to the CF card in the memory mode if it is not compatible with the True IDE mode. This is because, more often than not, the communication speed will be higher when the information processing apparatus makes access to the CF card in the True IDE mode than in the memory mode. An example of such an approach of related art is disclosed in JP-A-2004-355476.

However, some of CF cards offer a faster communication rate when accessed in the memory mode than in the True IDE mode. In such a type of CF cards, it is possible to shorten data transfer time if the memory mode is selected for performing data exchange therewith instead of the True IDE mode.

In addition, in the True IDE mode, some of CF cards support a READ MULTIPLE command and a WRITE MULTIPLE command that instruct read operation and write operation to be performed in the minimum operation unit constituted by a plurality of sectors, respectively. In such a type of CF cards, it is possible to achieve a shorter data transfer time if the READ MULTIPLE command and the WRITE multiple command are used for performing data exchange therewith.

The maximum number of sectors, which defines a unit of sectors that constitutes a periodic interval at which an interruption occurs, varies from one CF card to another depending on the type of cards that support the READ MULTIPLE command and the WRITE MULTIPLE command. When these commands are supported, generally speaking, the frequency of the occurrences of interruption events decreases as the maximum number of sectors increases. As the frequency of the occurrences of interruptions decreases, time required for data transfer becomes shorter.

For reasons described above, it is possible to further shorten time required for data transfer if the information processing apparatus makes an intelligent decision as to whether to perform data exchange in the memory mode or to perform data exchange in the True IDE mode while taking additional factor(s) into consideration such as the compatibility of the target CF card with the READ MULTIPLE command and the WRITE MULTIPLE command and, if the target CF card supports the READ MULTIPLE command and the WRITE MULTIPLE command, the maximum number of sectors.

SUMMARY

An advantage of some aspects of the invention is to provide an information processing apparatus that is capable of selecting one suitable operation mode when there is a plurality of operation modes in which the apparatus can perform data exchange with a card-type medium.

In order to address the above-identified problem without any limitation thereto, the invention provides, as a first aspect of at least one embodiment thereof, an information processing apparatus including: a card slot in which a card-type medium is inserted; a first communication speed acquisition section that acquires a first communication speed, which is a communication speed achieved when performing data exchange with the card-type medium in a first operation mode; a second communication speed acquisition section that acquires a second communication speed, which is a communication speed achieved when performing data exchange with the card-type medium in a second operation mode; an interruption-free maximum data size acquisition section that acquires an interruption-free maximum data size, which is the maximum data size by means of which data exchange can be performed without causing the occurrence of an interruption, when performing data exchange with the card-type medium in the second operation mode; a judgment section that judges which one of the first operation mode and the second operation mode offers a faster data exchange with the card-type medium on the basis of the first communication speed, the second communication speed, and the interruption-free maximum data size; and a data communication section that performs data exchange with the card-type medium in the operation mode that is judged by the judgment section as the faster mode that offers a faster data exchange with the card-type medium, which is either the first operation mode or the second operation mode.

In the configuration of the information processing apparatus according to the first aspect of at least one embodiment of the invention described above, it is preferable that the first communication speed acquisition section acquires the first communication speed at the point in time when the card-type medium is detected at the card slot; the second communication speed acquisition section acquires the second communication speed at the point in time when the card-type medium is detected at the card slot; the interruption-free maximum data size acquisition section acquires the interruption-free maximum data size at the point in time when the card-type medium is detected at the card slot; and the judgment section judges which one of the first operation mode and the second operation mode offers a faster data exchange with the card-type medium at the point in time when the card-type medium is detected at the card slot.

It is preferable that the information processing apparatus according to the first aspect described above further includes a plurality of mode selection tables each of which is prepared for corresponding one of a plurality of the interruption-free maximum data sizes that are predetermined for the second operation mode. In addition thereto, in such a configuration, it is preferable that, on the premise that data exchange is performed in the second operation mode by a corresponding one of the plurality of interruption-free maximum data sizes, each of the plurality of mode selection tables shows, in tabular form, which one of the first operation mode and the second operation mode offers a faster data exchange, for each combination of a value of the first communication speed and a value of the second communication speed; and the judgment section selects one mode selection table that corresponds to the interruption-free maximum data size of the card-type medium inserted in the card slot among the plurality of mode selection tables, and judges which one of the first operation mode and the second operation mode offers a faster data exchange with the card-type medium while making reference to the selected mode selection table.

In the configuration of the information processing apparatus according to the first aspect described above, it is preferable that the card-type medium is a Compact Flash (Registered Trademark) card.

In addition thereto, in such a configuration, the first operation mode may be a memory mode; the second operation mode may be a True IDE mode; and the interruption-free maximum data size may be the maximum number of sectors.

In order to address the above-identified problem without any limitation thereto, at least one embodiment of the invention provides, as a second aspect thereof, a method for controlling an information processing apparatus having a card slot in which a card-type medium is inserted, the method including; acquiring a first communication speed, which is a communication speed achieved when performing data exchange with the card-type medium in a first operation mode; acquiring a second communication speed, which is a communication speed achieved when performing data exchange with the card-type medium in a second operation mode; acquiring an interruption-free maximum data size, which is the maximum data size by means of which data exchange can be performed without causing the occurrence of an interruption, when performing data exchange with the card-type medium in the second operation mode; judging which one of the first operation mode and the second operation mode offers a faster data exchange with the card-type medium on the basis of the first communication speed, the second communication speed, and the interruption-free maximum data size; and performing data exchange with the card-type medium in the operation mode that is judged as the faster mode that offers a faster data exchange with the card-type medium, which is either the first operation mode or the second operation mode.

In order to address the above-identified problem without any limitation thereto, the invention provides, as a third aspect of at least one embodiment thereof, a program for controlling an information processing apparatus having a card slot in which a card-type medium is inserted, the program instructing the information processing apparatus to execute the processing of; acquiring a first communication speed, which is a communication speed achieved when performing data exchange with the card-type medium in a first operation mode; acquiring a second communication speed, which is a communication speed achieved when performing data exchange with the card-type medium in a second operation mode; acquiring an interruption-free maximum data size, which is the maximum data size by means of which data exchange can be performed without causing the occurrence of an interruption, when performing data exchange with the card-type medium in the second operation mode; judging which one of the first operation mode and the second operation mode offers a faster data exchange with the card-type medium on the basis of the first communication speed, the second communication speed, and the interruption-free maximum data size; and performing data exchange with the card-type medium in the operation mode that is judged as the faster mode that offers a faster data exchange with the card-type medium, which is either the first operation mode or the second operation mode.

BRIEF DESCRIPTION OF THE DRAWINGS

The invention will be described with reference to the accompanying drawings, wherein like numbers reference like elements.

FIG. 5 is a table that illustrates a list of cycle time patterns supported in the memory mode.

FIG. 6 is a table that illustrates a list of cycle time patterns supported in the PIO modes of the True IDE mode.

FIG. 7 is a diagram that illustrates an example of a mode selection lookup table that is referred to when making a judgment to select one preferable operation mode that offers a faster data transfer rate than that of the other (used as a reference table if a READ MULTIPLE command and a WRITE MULTIPLE command are not supported).

FIG. 8 is a diagram that illustrates an example of another mode selection lookup table that is referred to when making a judgment to select one preferable operation mode that offers a faster data transfer rate than that of the other (used as a reference table when the maximum number of sectors of the READ MULTIPLE command and the WRITE MULTIPLE command is two).

FIG. 10 is a diagram that illustrates an example of another mode selection lookup table that is referred to when making a judgment to select one preferable operation mode that offers a faster data transfer rate than that of the other (used as a reference table when the maximum number of sectors of the READ MULTIPLE command and the WRITE MULTIPLE command is eight).

DESCRIPTION OF EXEMPLARY EMBODIMENTS

With reference to the accompanying drawings, an exemplary embodiment of the invention is explained below. Needless to say, it should be noted that the exemplary embodiment of the invention described below has no intention to limit the technical scope of the invention.

Figure 1:
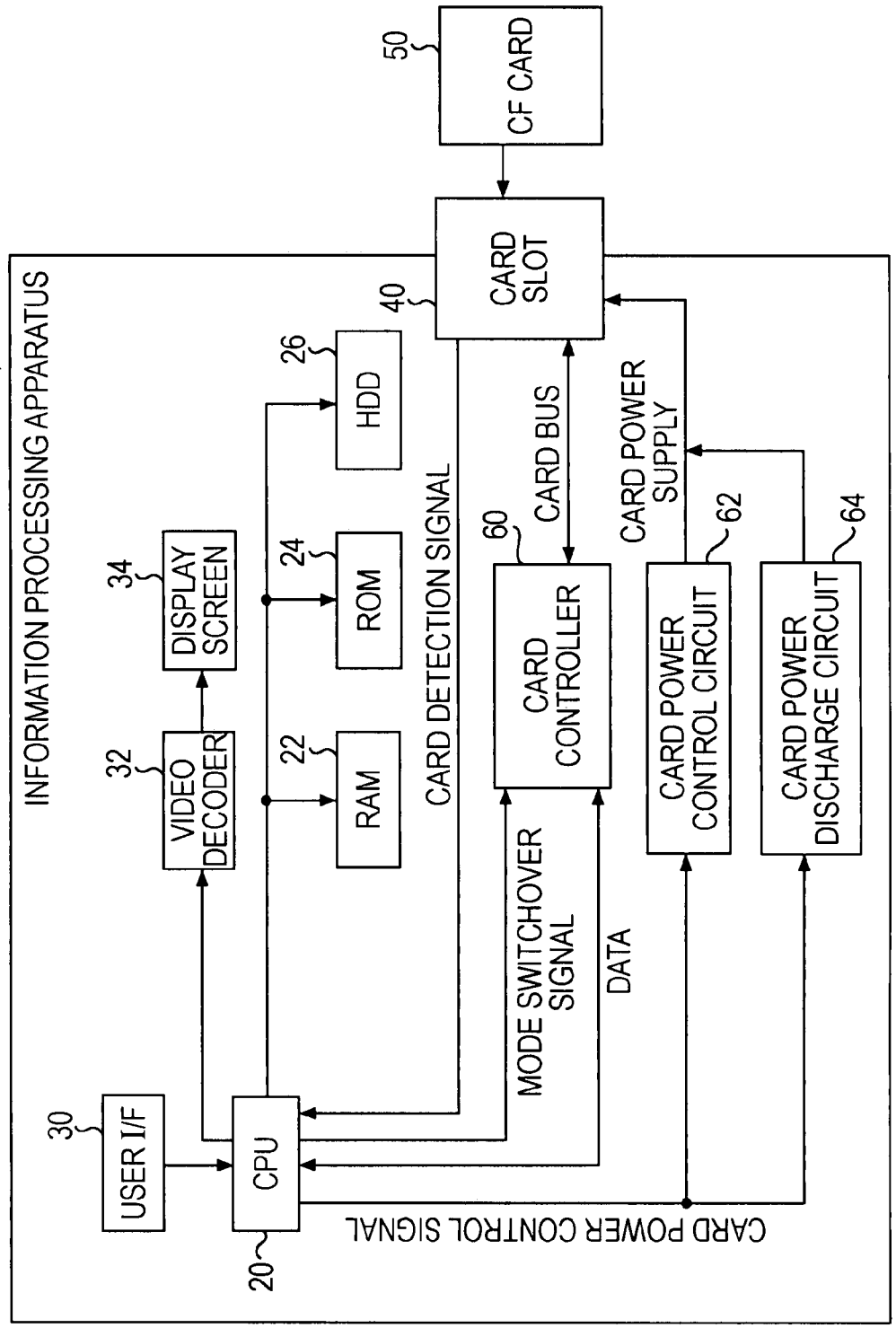
FIG. 1 is a block diagram that illustrates an example of the inner configuration of an information processing apparatus according to an exemplary embodiment of the invention.

FIG. 1 is a block diagram that illustrates an example of the inner configuration of an information processing apparatus 10 according to an exemplary embodiment of the invention. The information processing apparatus 10 represents a wide variety of information processing apparatuses that are provided with card slot(s). As a few non-limiting examples, the information processing apparatus 10 may be configured as a small-sized handheld terminal/portable digital assistant, a digital camera, a notebook-sized personal computer or desktop personal computer.

As illustrated in FIG. 1, the information processing apparatus 10 according to the present embodiment of the invention is provided with a CPU (Central Processing unit) 20, a RAM (Random Access Memory) 22, a ROM (Read Only Memory) 24, a hard disk drive (HDD) 26, a user interface 30, a video decoder 32, and a display screen 34.

The CPU 20, the RAM 22, the ROM 24, and the hard disk drive 26 are interconnected with one another via an internal bus. With such a configuration, the CPU 20 is able to make free access to the RAM 22, the ROM 24, and the hard disk drive 26 via the internal bus.

Image data is outputted from the CPU 20 to the video decoder 32. The image data is then decoded at the video decoder 32 so as to be displayed on the display screen 34. An LCD (Liquid Crystal Display), a CRT (Cathode Ray Tube), or any similar display device constitutes the display screen 34. Note that the display screen 34 may be built in the information processing apparatus 10 as a component thereof, or it may be provided as an external device that is connected to the information processing apparatus 10.

A user inputs various kinds of operation commands through the user interface 30, which are forwarded to the CPU 20. The user interface 30 may be configured as, for example, a single button or plural buttons, a keyboard, a pointing device, or the like. The user interface 30 may be made up of a combination of these buttons, keyboard, pointing device, and the like. According to an example illustrated in FIG. 1, the user interface 30 is built in the information processing apparatus 10 as its internal component. Notwithstanding the foregoing, the user interface 30 may be provided as an external device that is connected to the outside of the information processing apparatus 30. On the basis of the operation instructions given by the user via the user interface 30, the CPU 20 executes various kinds of operation/processing.

The information processing apparatus 10 according to the present embodiment of the invention is provided with a card slot 40. In the present embodiment of the invention, a user inserts a CF card 50 into the card slot 40. Data such as still images and/or moving picture, though not limited thereto, are stored in the CF card 50. The information processing apparatus 10 reads out the still image data/moving picture data memorized in the CF card 50 to display it on the display screen 34.

In the present embodiment of the invention, it is assumed that a user inserts various kinds of CF cards 50 into the card slot 40. That is, it is assumed herein that different types of CF cards 50 that are compatible with a variety of operation modes varying from one to another could be inserted into the card slot 40.

In the following description, just for the purpose of explanation, it is assumed that a memory card that can be operated both in the memory mode and in the True IDE mode is inserted into the card slot 40 as a CF card. In the present embodiment of the invention, an error occurs when an I/O card that is operable in an I/O mode is inserted into the card slot 40. Needless to say, if any new standard format other than the ones described above is established in the future, it is conceivable that a CF card conforming to such a new standard format is inserted into the card slot 40 of the information processing apparatus 10.

The CPU 20 is responsible for controlling, via a card controller 60, the CF card 50 that is inserted in the card slot 40. Specifically, the CPU 20 makes a judgment as to whether the CF card 50 is inserted in the card slot 40 on the basis of a card detection signal that is outputted from the card slot 40. In addition, when the CF card 50 is inserted therein, the CPU 20 outputs a mode switchover signal to the card controller 60 so as to make a switchover between a memory mode access and a True IDE mode access. If the information processing apparatus 10 further supports the card I/O mode, a switchover to the card I/O mode is also performed by means of the above-mentioned mode switchover signal.

The card controller 60 is connected to the card slot 40 via a card bus. With such a configuration, the CPU 20 performs data exchange (i.e., data interaction) with the CF card 50 inserted in the card slot 40 via the card controller 60.

Power for the CF card is supplied from a card power control circuit 62 to the CF card 50 inserted in the card slot 40 via a power line. The control as to whether the card power control circuit 62 supplies power to the CF card 50 or not is performed on the basis of a card power control signal that is outputted from the CPU 20. Specifically, the CPU 20 outputs a card power control signal for causing the card power control circuit 62 to supply a card power to the CF card 50 when the CPU 20 detects the insertion of the CF card 50 or when the CPU 20 attempts to make access to the CF card 50. On the other hand, the CPU 20 outputs a card power control signal for causing the card power control circuit 62 to stop the supply of the card power to the CF card 50 when the CPU 20 detects the removal of the CF card 50 or when the CPU 20 exits from the card-access state. For example, in the present embodiment of the invention, the card power control signal for instructing the card power control circuit 62 to supply a card power to the CF card 50 is set at a high level, whereas the card power control signal for instructing the card power control circuit 62 to stop the supply of the card power to the CF card 50 is set at a low level.

In the present embodiment of the invention, the card power control signal that is outputted from the CPU 20 is also supplied to a card power discharge circuit 64. The card power discharge circuit 64 is configured to switch between an ON state and an OFF state on the basis of the card power control signal. Specifically, the card power discharge circuit 64 enters an ON state when it receives the card power control signal that instructs no card power to be supplied. When turned ON, the card power discharge circuit 64 connects a power line that supplies a card power to a ground via a resistor. Therefore, when the card power is switched over from ON to OFF, the card power discharge circuit 64 forcibly discharges the power line of the card power; and as a result thereof, the card power drops steeply to the ground level. On the other hand, the card power discharge circuit 64 enters an OFF state when it receives the card power control signal that instructs card power to be supplied. When turned OFF, the card power discharge circuit 64 does not connect the power line of the card power to the ground. Therefore, it is possible to avoid unnecessary current from flowing through the power line to the ground during a time period in which the card power is supplied. Notwithstanding the foregoing, it should be noted that the card power discharge circuit 64 is not an indispensable circuit in the present embodiment of the invention and thus may be omitted without affecting the distinctive features of the invention.

It should be further noted that the specific conditions that determine card power ON/OFF are decided on the basis of the specification of the information processing apparatus 10 and the CF card 50.

Figure 2:
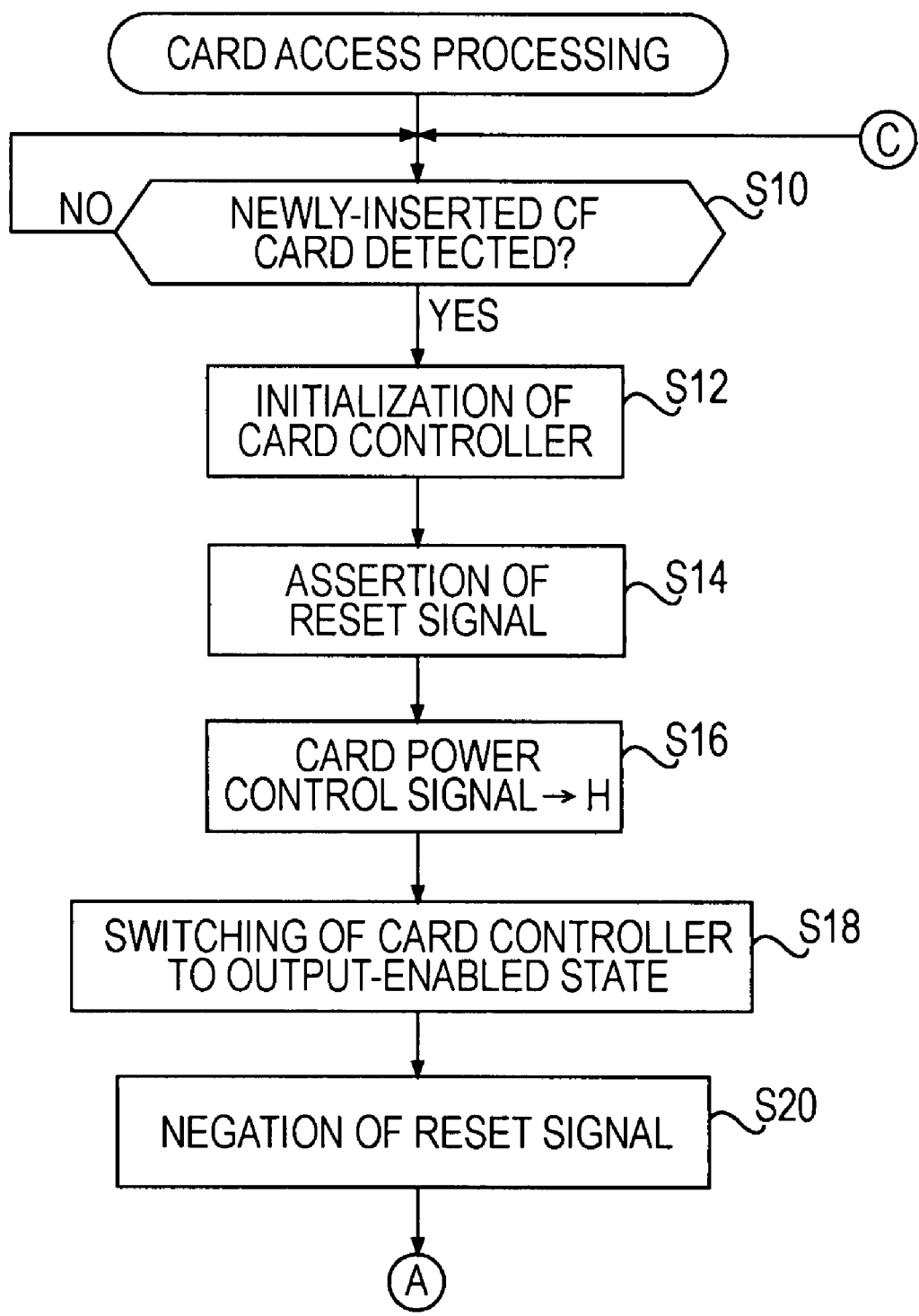
FIG. 2 is a part of a flowchart that explains an example of card access processing that is performed by the information processing apparatus illustrated in FIG. 1 (Part 1).
Figure 3:
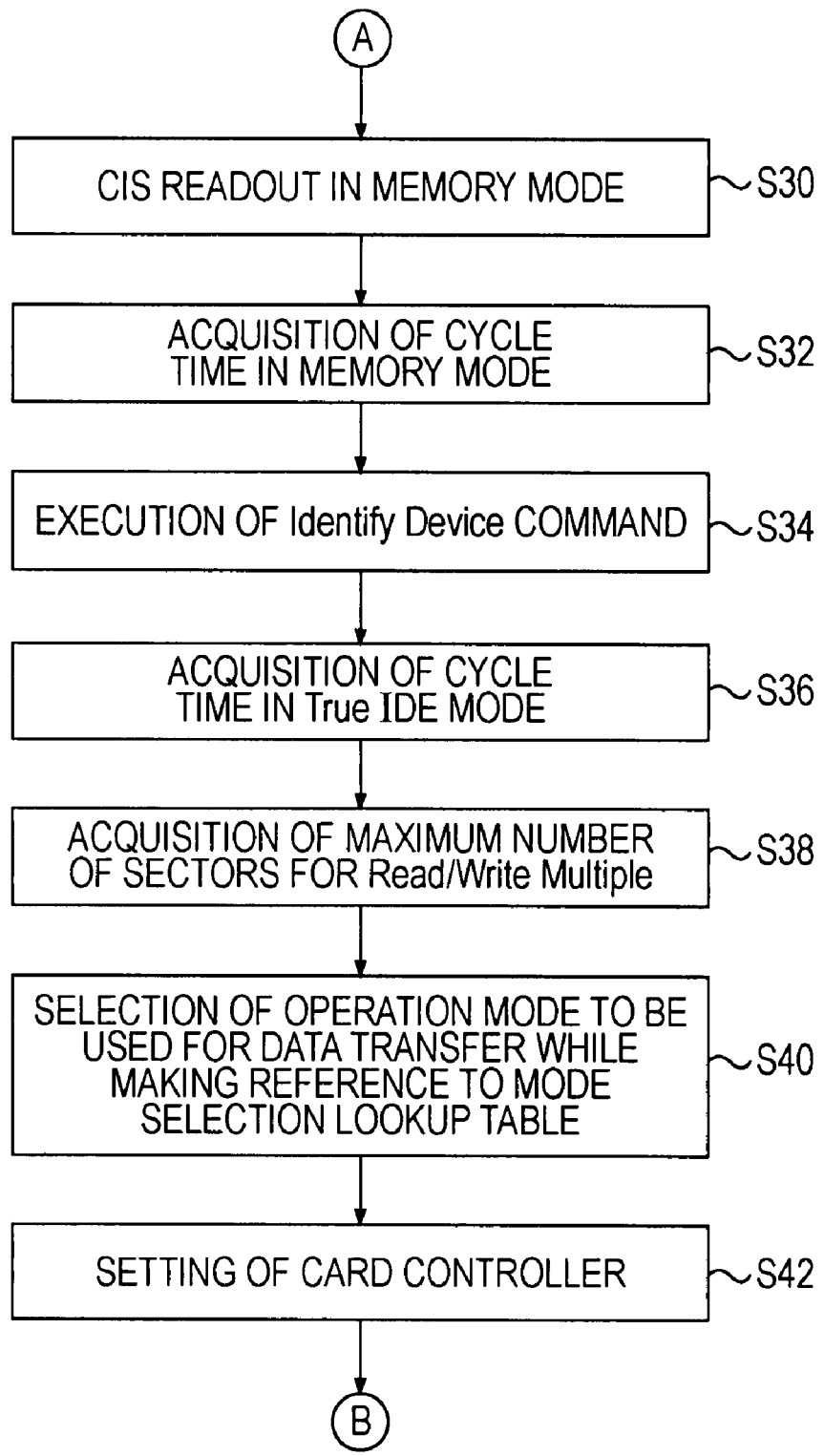
FIG. 3 is another part of the flowchart that explains an example of card access processing that is performed by the information processing apparatus illustrated in FIG. 1 (Part 2).
Figure 4:
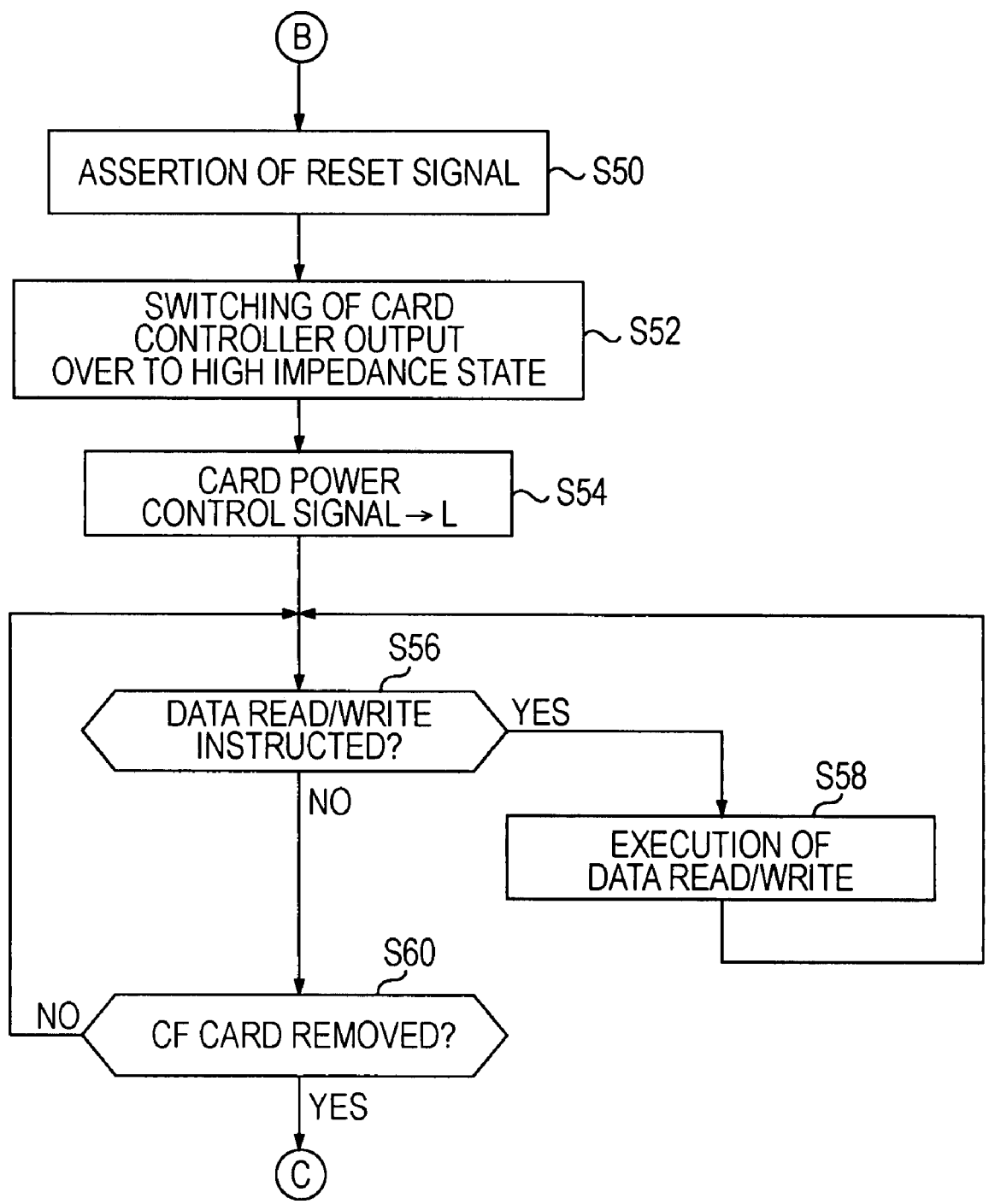
FIG. 4 is still another part of the flowchart that explains an example of card access processing that is performed by the information processing apparatus illustrated in FIG. 1 (Part 3).

Next, with reference to FIGS. 2, 3, and 4, an explanation is given of card access processing that is constantly carried out by the information processing apparatus 10. The card access processing is implemented when the CPU 20 reads out a card-access-processing program that is stored in the ROM 24 or the hard disk drive 26. The card access processing is automatically initiated when the power of the information processing apparatus 10 is turned ON.

As illustrated in FIG. 2, the information processing apparatus 10 judges whether the card slot 40 has detected a newly-inserted CF card 50 or not (step S10). In the present embodiment of the invention, the information processing apparatus 10 makes a judgment as to whether a "new" CF card 50 is inserted in the card slot 40 or not on the basis of the aforementioned card detection signal that is outputted from the card slot 40. Specifically, the information processing apparatus 10 recognizes that a new CF card 50 is inserted in the card slot 40 when the signal levels of both a CD1 signal and a CD2 signal change from high to low at the card slot 40. In addition, in the present embodiment of the invention, the information processing apparatus 10 checks the signal levels of the CD1 signal and the CD2 signal at the card slot 40 when the power of the information processing apparatus 10 is turned ON; and the information processing apparatus 10 recognizes that a new CF card 50 is inserted in the card slot 40 if the signal levels of both of the CD1 signal and the CD2 signal are at the low level when the power of the information processing apparatus 10 is turned ON. That is, the information processing apparatus 10 recognizes that a new CF card 50 is inserted in the card slot 40 if, in addition to the above-described "new" insertion, there is a CF card 50 that has already been inserted in the card slot 40 at the time of its power activation. In other words, in the present embodiment of the invention, as long as the CF card 50 is inserted (i.e., is present) in the card slot 40, the signal levels of the CD1 signal and the CD2 signal are low. On the other hand, the CD1 signal and the CD2 signal are at high level if the CF card 50 is not inserted (i.e., is absent) therein.

If it is judged that the card slot 40 does not detect any new CF card 50 in the step S10 (step S10: NO), this step S10 is repetitively executed until a new CF card 50 is detected at the card slot 40, which means a standby state.

On the other hand, if it is judged that the card slot 40 has now detected a new CF card 50 in the step S10 (step S10: YES), the information processing apparatus 10 performs the initialization of the card controller 60 (step S12).

Next, the information processing apparatus 10 asserts the RESET signal of the CF card 50 (step S14). Subsequently, the information processing apparatus 10 switches the card power control signal from the low level to the high level so as to activate (i.e., turn ON) the card power (step S16). At this time, the CF card 50 is activated in the memory mode.

Next, the information processing apparatus 10 waits until the card power stabilizes. After the stabilization of the card power, the information processing apparatus 10 switches the card-side interface of the card controller 60 from a high-impedance state to an output-enabled state (i.e., a state in which output can be made) (step S18). Thereafter, the information processing apparatus 10 negates the RESET signal (step S20).

Next, as illustrated in FIG. 3, the information processing apparatus 10 reads out CIS information, which is card property information (i.e., card attribute information), in the memory mode (step S30).

Then, on the basis of the readout CIS information, the information processing apparatus 10 checks the cycle time in the memory mode of the CF card 50 inserted in the card slot 40, and acquires the identified cycle time as the result thereof (step S32).

FIG. 5 is a table that illustrates a list of cycle time patterns with which the CF card 50 might be compatible in the memory mode. As illustrated in FIG. 5, in the present embodiment of the invention, the CF card 50 operates in any one of cycle time patterns that include 250 ns, 150 ns, 120 ns, 100 ns, and 80 ns. It is possible to know the specific cycle time with which the CF card 50 is compatible by making reference to bits 2-0 of the device ID in byte 2 in CISTPL_DEVICE tuple of the CIS information. Accordingly, in the step S32, the information processing apparatus 10 identifies the cycle time with which the inserted CF card 50 is compatible on the basis of the readout CIS information. Then, on the basis of the identified cycle time, the information processing apparatus 10 identifies the communication speed that will be achieved in the memory mode. Herein, since the cycle time indicates the time of one cycle of a basic operation clock, the basic operation will become faster as the cycle time becomes shorter.

Although the cycle time of 150 ns is not supported by "CF+ and Compact Flash Specification Revision 4.0", standard, some types of a normal CF card 50 and a Microdrive (Registered Trademark) having a built-in hard disk drive are configured to operate under the cycle time of 150 ns. For this reason, the information processing apparatus 10 according to the present embodiment of the invention is configured to support the CF card 50 and the Microdrive that operate in the cycle time of 150 ns.

Next, the information processing apparatus 10 performs an IDENTIFY DEVICE command (Step S34), and then acquires the cycle time of the True IDE mode (step S36). That is, in the True IDE mode, too, compatible transfer modes vary depending on the type of the CF card 50; accordingly, communication speeds, that is, cycle time, vary depending on the compatible transfer mode. For this reason, it is necessary for the information processing apparatus 10 to investigate (i.e., check, or confirm) the compatible transfer mode.

Generally speaking, the transfer mode of the True IDE can be classified roughly into three modes, that is, PIO mode, Multiword DMA mode, and Ultra DMA mode. Several modes are specified for each of these three transfer modes for each compatible speed. In the following description of the information processing apparatus 10 according to the present embodiment of the invention, for the purpose of explanation, the image is assumed to be compatible with the PIO mode only among the above-mentioned three transfer modes.

In addition, it is further assumed that the information processing apparatus 10 according to the present embodiment of the invention conforms to, among the PIO modes, the Revision 4.0 (CF+ and Compact Flash Specification Revision 3.0), which is the latest revision thereof. Since the PIO mode of the Revision 4.0 defines the PIO modes 0, 1, 2, 3, 4, 5, and 6, the information processing apparatus 10 judges which one of these PIO modes the inserted CF card 50 is compatible with.

FIG. 6 is a table that illustrates a list of cycle time patterns defined in the modes 0, 1, 2, 3, 4, 5, and 6 of the PIO mode. As illustrated in FIG. 6, in the PIO mode, the PIO mode 0 is the slowest in terms of its communication speed, which offers the cycle time of 600 ns. The communication speed increases as the mode number increases toward the PIO mode 6. The PIO mode 6 offers the fastest cycle time of 80 ns.

It should be noted that the IDENTIFY DEVICE command may be executed in the memory mode, or alternatively, in the True IDE mode. The IDENTIFY DEVICE command may be executed without involving any additional step after the step S30 if it is executed in the memory mode. On the other hand, if the IDENTIFY COMMAND is executed in the True IDE mode, it is necessary to go thorough the following series of steps; that is, firstly, the supply of the card power to the CF card 50 is suspended; next, after the falling of the card power to a sufficiently low level, the supply of the card power is resumed while fixing an OE signal at a ground level so as to re-activate the CF card 50 in the True IDE mode; and thereafter, the IDENTIFY COMMAND is executed in the True IDE mode.

Next, the information processing apparatus 10 acquires the maximum number of sectors (i.e., maximum sector count) in the READ/WRITE MULTIPLE block of the CF card 50 (step S38). Specifically, the information processing apparatus 10 acquires the maximum number of sectors of the READ/WRITE MULTIPLE support obtained by the IDENTIFY DEVICE command executed in the step S34. In the present embodiment of the invention, the information processing apparatus 10 checks eight bits 7-0 of a word 47 among the answer given from the CF card 50 in response to the IDENTIFY DEVICE command, and makes a judgment on the basis of the identified value that is indicated by the above-mentioned eight bits 7-0 of the word 47.

In a theoretical sense, the maximum number of sectors indicated by the above-mentioned eight bits 7-0 of the word 47 could be 2, 4, 8, 16, 32, 64, and 128. However, the maximum number of sectors offered by currently commercially available products are mostly two, four, or eight. Therefore, in the present embodiment of the invention, it is assumed that the maximum number of sectors is any one of two, four, and eight for the purpose of explanation. Notwithstanding the foregoing, in actual implementation of the invention, the product may be designed while further taking into consideration a possible case where the maximum number of sectors is any one of the theoretically possible values described above other than two, four, and eight assumed herein.

When a normal READ SECTOR command and a WRITE SECTOR command are used in data exchange with the CF card 50, one interruption occurs for each sector when performing data transfer. In contrast, when the READ MULTIPLE command and the WRITE MULTIPLE command are used, an interruption occurs only at an interval of every set group (i.e., unit, or block) of sectors. For this reason, in comparison with a case where data transfer is carried out by means of the normal READ SECTOR command and the normal WRITE SECTOR command, it is possible to shorten time required for data transfer if it is carried out by means of the READ MULTIPLE command and the WRITE MULTIPLE command. The setting of the number of sectors when the READ MULTIPLE command and the WRITE MULTIPLE command are used is done by means of a SET MULTIPLE MODE command. Note that it is preferable to set the number of sectors at the maximum sector count (i.e., the maximum number of sectors) supported by the CF card 50 because the frequency of the occurrences of interruption events decreases as the set number of sectors increases.

Next, as illustrated in FIG. 3, the information processing apparatus 10 makes reference to a mode selection lookup table so as to select one operation mode that is used for data transfer (step S40). Each of FIGS. 7-10 is a diagram that illustrates an example of a mode selection lookup table according to the present embodiment of the invention. In the present embodiment of the invention, these mode selection lookup tables are memorized in the ROM 24 or the hard disk drive 26 in advance.

Figure 9:
FIG. 9 is a diagram that illustrates an example of another mode selection lookup table that is referred to when making a judgment to select one preferable operation mode that offers a faster data transfer rate than that of the other (used as a reference table when the maximum number of sectors of the READ MULTIPLE command and the WRITE MULTIPLE command is four).

FIG. 7 illustrates a mode selection lookup table TB10 that is referred to when the CF card 50 does not support the READ MULTIPLE command and the WRITE MULTIPLE command. FIG. 8 illustrates a mode selection lookup table TB20 that is referred to when the maximum number of sectors of the READ MULTIPLE command and the WRITE MULTIPLE command of the CF card 50 is two. FIG. 9 illustrates a mode selection lookup table TB30 that is referred to when the maximum number of sectors of the READ MULTIPLE command and the WRITE MULTIPLE command of the CF card 50 is four. FIG. 10 illustrates a mode selection lookup table TB40 that is referred to when the maximum number of sectors of the READ MULTIPLE command and the WRITE MULTIPLE command of the CF card 50 is eight.

As understood from these drawings, the mode selection lookup tables TB10-TB40 from a set of reference tables that shows, in tabular form, which one of these two operation modes, that is, either the memory mode or the True IDE mode, offers a faster communication speed than that of the other as a result of comparisons made between the cycle time supported in the memory mode and a counterpart speed offered by the PIO mode of the True IDE mode, where each of these mode selection lookup tables TB20-TB40 shows the comparison results corresponding to one of the values of the maximum number of sectors assumed herein (i.e., two, four, or eight). Whereas, the mode selection lookup table TB10 corresponds to the case where the CF card 50 does not support the READ MULTIPLE command and the WRITE MULTIPLE command. In other words, on the premise that the maximum number of sectors corresponding to each of these mode selection lookup tables TB10-TB40 is adopted when carrying out data exchange (except that the mode selection lookup table TB10 has no corresponding maximum number of sectors because it is assumed therein that the CF card 50 does not support the READ MULTIPLE command and the WRITE MULTIPLE command unlike the mode selection lookup tables TB20-40), these mode selection lookup tables TB10-40 show, in tabular form, which one of these two operation modes, that is, either the memory mode or the PIO mode of the True IDE mode, offers a faster communication speed than that of the other, where the comparison result is shown therein for each combination of the cycle time supported in the memory mode and the counterpart speed offered by the PIO mode of the True IDE mode.

Accordingly, on the basis of the maximum number of sectors supported by the CF card 50, the information processing apparatus 10 decides which one of the mode selection lookup tables TB10-40 should be used as a reference. Then, on the basis of (i.e., while making reference to) the chosen mode selection lookup table, the information processing apparatus 10 selects one suitable operation mode that offers a faster transfer rate than that of the other, which is selected from operation modes with which the newly detected CF card 50 is compatible.

For example, the information processing apparatus 10 makes reference to the mode selection lookup table TB10 in a case where the CF card 50 does not support the READ MULTIPLE command and the WRITE MULTIPLE command. Then, if the CF card 50 is compatible with the cycle time of 250 ns in the memory mode whereas it is compatible with the PIO mode 1 of 383 ns in the True IDE mode, the information processing apparatus 10 selects the memory mode.

In another example, the information processing apparatus 10 makes reference to the mode selection lookup table TB40 in a case where the maximum number of sectors of the READ MULTIPLE command and the WRITE MULTIPLE command is eight. Then, if the CF card 50 is compatible with the cycle time of 250 ns in the memory mode whereas it is compatible with the PIO mode 1 of 383 ns in the True IDE mode, the information processing apparatus 10 selects, in this case, the True IDE mode. As understood from the comparison of the former example and the latter example described above, even under the same given cycle time conditions, that is, even in the same conditions where the CF card 50 is compatible with the cycle time of 250 ns in the memory mode whereas it is compatible with the PIO mode 1 of 383 ns in the True IDE mode, the operation mode selected by the information processing apparatus 10 could be different in one case from another depending on other factors such as the compatibility/non-compatibility of the CF card 50 with the READ MULTIPLE command and the WRITE MULTIPLE command (or in other words, whether the CF card 50 supports the READ MULTIPLE command and the WRITE MULTIPLE command or not) and, if so, the maximum number of sectors thereof.

Since the memory mode is a completely different operation mode from the True IDE mode, as it is clear from these mode selection lookup tables TB10-TB40, one operation mode that offers a shorter cycle time than that of the other does not always provide a faster data transfer rate when time required for data transfer is compared therebetween. Taking the above fact into consideration, instead of making a simple comparison based only on cycle time, the information processing apparatus 10 according to the present embodiment of the invention has the mode selection lookup tables TB10-40 that have been prepared on the basis of comparisons of pre-investigated times required for data transfer in the memory mode and the True IDE mode, the applicable one of which is selected for making an intelligent selection of one suitable operation mode that achieves a faster data transfer than that of the other.

As one can understand by comparing the mode selection lookup tables TB10-40 with one another, the number of cases where the True IDE mode is selected for data transfer increases in accordance with the increase in the maximum number of sectors of the READ MULTIPLE command and the WRITE MULTIPLE command. This is because it becomes less frequent that interruptions occur during data transfer performed by means of the READ MULTIPLE command and the WRITE MULTIPLE command as the maximum number of sectors increases, which shortens the total data transfer time.

For the purpose of giving a more specific explanation of the above, the mode selection lookup table TB10 is now compared with the mode selection lookup table TB20. It is assumed that the CF card 50 is compatible with the cycle time of 100 ns in the memory mode whereas it is compatible with the PIO mode 4 in the True IDE mode. According to the mode selection lookup table TB10, the memory mode is selected as the advantageous operation mode under such an assumption (i.e., combination). In contrast, if the mode selection lookup table TB20 is used as a reference table, under the same assumption as above, the True IDE mode in place of the memory mode is selected as the advantageous operation mode. As another example, it is assumed that the CF card 50 is compatible with the cycle time of 80 ns in the memory mode whereas it is compatible with the PIO mode 5 in the True IDE mode. According to the mode selection lookup table TB10, the memory mode is selected as the advantageous operation mode under such an assumption. In contrast, if the mode selection lookup table TB20 is used as a reference table, under the same assumption as above, the True IDE mode in place of the memory mode is selected as the advantageous operation mode.

For the purpose of giving another specific explanation of the above, the mode selection lookup table TB20 is now compared with the mode selection lookup table TB30. It is assumed that the CF card 50 is compatible with the cycle time of 150 ns in the memory mode whereas it is compatible with the PIO mode 3 in the True IDE mode. According to the mode selection lookup table TB20, the memory mode is selected as the advantageous operation mode under such an assumption. In contrast, if the mode selection lookup table TB30 is used as a reference table, under the same assumption as above, the True IDE mode in place of the memory mode is selected as the advantageous operation mode. As another example, it is assumed that the CF card 50 is compatible with the cycle time of 80 ns in the memory mode whereas it is compatible with the PIO mode 4 in the True IDE mode. According to the mode selection lookup table TB20, the memory mode is selected as the advantageous operation mode under such an assumption. In contrast, if the mode selection lookup table TB30 is used as a reference table, under the same assumption as above, the True IDE mode in place of the memory mode is selected as the advantageous operation mode.

For the purpose of giving still another specific explanation of the above, the mode selection lookup table TB30 is now compared with the mode selection lookup table TB40. It is assumed that the CF card 50 is compatible with the cycle time of 250 ns in the memory mode whereas it is compatible with the PIO mode 1 in the True IDE mode. According to the mode selection lookup table TB30, the memory mode is selected as the advantageous operation mode under such an assumption. In contrast, if the mode selection lookup table TB40 is used as a reference table, under the same assumption as above, the True IDE mode in place of the memory mode is selected as the advantageous operation mode. As another example, it is assumed that the CF card 50 is compatible with the cycle time of 150 ns in the memory mode whereas it is compatible with the PIO mode 2 in the True IDE mode. According to the mode selection lookup table TB30, the memory mode is selected as the advantageous operation mode under such an assumption. In contrast, if the mode selection lookup table TB40 is used as a reference table, under the same assumption as above, the True IDE mode in place of the memory mode is selected as the advantageous operation mode. As still another example, it is assumed that the CF card 50 is compatible with the cycle time of 120 ns in the memory mode whereas it is compatible with the PIO mode 3 in the True IDE mode. According to the mode selection lookup table TB30, the memory mode is selected as the advantageous operation mode under such an assumption. In contrast, if the mode selection lookup table TB40 is used as a reference table, under the same assumption as above, the True IDE mode in place of the memory mode is selected as the advantageous operation mode. As still another example, it is assumed that the CF card 50 is compatible with the cycle time of 100 ns in the memory mode whereas it is compatible with the PIO mode 3 in the True IDE mode. According to the mode selection lookup table TB30, the memory mode is selected as the advantageous operation mode under such an assumption. In contrast, if the mode selection lookup table TB40 is used as a reference table, under the same assumption as above, the True IDE mode in place of the memory mode is selected as the advantageous operation mode.

Next, as illustrated in FIG. 3, the information processing apparatus 10 performs the setting of the card controller 60 (step S42). That is, the information processing apparatus 10 performs the setting of the card controller 60 so that it becomes compatible with the operation mode selected in the step S40.

Next, the information processing apparatus 10 asserts the RESET signal of the CF card 50 as illustrated in FIG. 4 (step S50). Then, the information processing apparatus 10 switches the card-side interface of the card controller 60 from the output-enabled state to the high-impedance state (step S52).

Subsequently, the information processing apparatus 10 switches the card power control signal from the high level to the low level so as to deactivate (i.e., turn OFF) the card power (step S54). It is unknown when a data read/write request is actually issued against the CF card 50. Therefore, in the present embodiment of the invention, the information processing apparatus 10 is configured to suspend the supply of the card power to the CF card 50 for the purpose of reducing power consumption. Then, the information processing apparatus 10 enters a standby state in which the supply of the card power is stopped while waiting for the actual occurrence of a data read/write event requested against the CF card 50.

Notwithstanding the foregoing, the timing at which the card power supply is stopped may be determined arbitrarily and thus not limited to the above-described example. For example, the card power supply may be stopped immediately after completion of the step S42. Or, alternatively, the card power supply may be stopped after the elapsing of a predetermined time (for example, ten seconds) after completion of the step S42. In particular, if it is anticipated that a user issues a data read/write request to the CF card 50 in a short time after the insertion of the CF card 50 into the card slot 40, the card power supply may be stopped after the elapsing of a predetermined time after completion of the step S42. If it is considered that power consumed by the card power supply is tolerably small, these steps S50-S54 may be omitted. If these steps S50-S54 are omitted, the card power is continuously supplied to the CF card 50.

Next, the information processing apparatus 10 judges whether an actual instruction for writing data into the CF card 50 or reading data out of the CF card 50 has been issued or not (step S56). If an instruction for actually writing data into the CF card 50 or reading data out of the CF card 50 has been issued (step S56: YES), the information processing apparatus 10 executes the instructed data read/write operation against the CF card 50 in the operation mode selected in the step S40 (step S58). If the card power supply is suspended, it is necessary to resume card power at the point in time at which the data read/write event occurs against the CF card 50. After completion of the data read/write operation, the process returns to the step S56.

On the other hand, if it is judged that an instruction for actually writing data into the CF card 50 or reading data out of the CF card 50 has not been issued (step S56: NO), the information processing apparatus 10 further judges whether the CF card 50 has been removed from the card slot 40 or not (step S60). Specifically, the information processing apparatus 10 judges whether the CF card 50 has been removed from the card slot 40 or not by checking whether or not either one of the CD1 signal and the CD2 signal at the card slot 40 has changed its signal level (or both of the CD1 signal and the CD2 signal at the card slot 40 have changed their signal levels) from low to high. As has already been described, in the present embodiment of the invention, the information processing apparatus 10 recognizes that the CF card 50 has been (or, is) inserted in the card slot 40 when the signal levels of both of the CD1 signal and the CD2 signal change from high to low at the card slot 40 in the step S10, which is a judgment step for determining whether the CF card 50 has been inserted in the card slot 40 or not. In the step S60 where the information processing apparatus 10 judges whether the CF card 50 has been removed from the card slot 40 or not, the information processing apparatus 10 recognizes that the CF card 50 has been removed from the card slot 40 when the signal levels of either one of the CD1 signal and the CD2 signal changes from low to high at the card slot 40. If it is judged that the CF card 50 has not been removed from the card slot 40 (step S60: NO), the process returns to the step S56 described above.

On the other hand, if it is judged that the CF card 50 has been removed from the card slot 40 (step S60: YES), the process returns to the above-described step S10 that is illustrated in FIG. 2. Then, the information processing apparatus 10 waits until the next new CF card 50 is detected.

As described above, the information processing apparatus 10 according to the present embodiment of the invention checks the communication speed supported in the memory mode and the communication speed supported in the True IDE mode, and then performs data exchange in the preferable operation mode that offers a faster communication speed. With such a configuration, when data exchange is performed with the CF card 50, it is possible to shorten the waiting time for the benefit of a user. In particular, if the present embodiment of the invention is applied to a type of the CF card 50 that offers a faster cycle time in the memory mode than in the True IDE mode, it is possible to make a reliable decision so as to select a suitable operation mode that offers a faster communication speed.

In addition, the information processing apparatus 10 according to the present embodiment of the invention has the mode selection lookup tables TB10-40 that have been prepared on the basis of comparisons of pre-investigated time required for data transfer in the memory mode and the True IDE mode, where each of these mode selection lookup tables has been prepared for the corresponding maximum number of sectors when the data transfer is performed by means of the READ MULTIPLE command and the WRITE MULTIPLE command. Having such a configuration, if the CF card 50 supports the READ MULTIPLE command and the WRITE MULTIPLE command, the information processing apparatus 10 acquires the maximum number of sectors thereof, and then makes reference to one of the mode selection lookup tables TB10-40 that corresponds to the acquired maximum number of sectors. By this means, the information processing apparatus 10 can select the preferable operation mode that provides a faster data transfer rate than that of the other.

Moreover, since the information processing apparatus 10 decides which one of these operation modes should be used for data transfer at the point in time when the CF card 50 is inserted into the card slot 40, it is possible to start data transfer processing in a speedy manner at the time of the occurrence of an actual request for performing data transfer with the CF card 50. With such a configuration, it is possible to shorten the waiting time for the benefit of a user that is required for completion of data transfer.

It should be noted that the invention is in no case limited to the above exemplary embodiment but may be modified, adapted, changed, or improved in a variety of modes in its actual implementation. For example, although the maximum data size used when performing data communication in the True IDE mode is determined on the basis of the number of sectors in the exemplary embodiment of the invention described above, the unit of communication data size is not limited to the sector; that is, there are various kinds of alternative units that may be used as a substitute for the sector. Therefore, the invention can be generalized in such a manner that the maximum data size, which defines the maximum periodic interval at which interruptions occur when performing data exchange, is determined on the basis of a unit of data size that is specified in the communication standard/protocol.

Furthermore, although the CF (Compact Flash) (Registered Trademark) card is taken as an example of various kinds of card-type media in the exemplary embodiment of the invention described above, it is possible to apply the invention to other kinds of card-type media just in the same manner as described above. That is, the invention is applicable as long as all of the following conditions are met; two or more operation modes different from each other or one another are supported; data exchange with a card-type medium is performed in (one of) these operation modes that offer communication speeds different from each other or one another; and interruption-free maximum data sizes that are different from each other are supported, where each of the interruption-free maximum data sizes defines the maximum data size that constitutes an interval within which data exchange can be performed without causing the occurrence of an interruption.

The invention is applicable to various kinds of operation modes without any restriction to the memory mode, the True IDE mode, and the card I/O mode described above. As various kinds of operation modes are supported so as to correspond to a variety of kinds of card-type media, the invention is applicable by employing specific operation modes supported by the card-type medium used in actual implementation thereof.

In the exemplary embodiment of the invention described above, the information processing apparatus 10 selects a suitable operation mode that offers a faster data transfer rate by making a judgment on the basis of a comparison between the communication speed achieved in the memory mode and the counterpart speed achieved in the True IDE mode while making reference to one of the mode selection lookup tables TB10-40 illustrated in FIGS. 7-10, respectively. However, the basis of operation mode selection is not limited to the specific example described in the exemplary embodiment of the invention. That is, the invention may be modified so that the information processing apparatus 10 selects a preferable operation mode on the basis of some kind of a mathematical formula in place of the above reference tables. Therefore, it can be said that an approach/methodology for determining the preferable operation mode that achieves shorter data transfer time may be modified arbitrarily. A program for executing card-access processing explained in the above exemplary embodiment of the invention can be distributed on various kinds of storage media such as flexible disks, CD-ROMs (Compact Disc Read Only Memory), ROMs, memory cards, or any equivalent thereof. In such a configuration, the exemplary embodiment of the invention is implemented when the information processing apparatus 10 reads out the content of the program memorized in the storage medium and executes thereof.

The information processing apparatus 10 may be provided with other program(s) such as an operating system and different application program(s). In such a configuration, in order to utilize the above-mentioned other program(s) of the information processing apparatus 10, the storage medium may further memorize a program that contains a command for calling up a program that implements processing equivalent to one described in the exemplary embodiment of the invention described above out of a portfolio of programs that the information processing apparatus 10 has.

Alternatively, such a program could be distributed not on storage media but as a carrier via a network. In such a configuration, the information processing apparatus 10 receives the program that is transmitted as a carrier via a network, and then executes the program so as to implement the exemplary embodiment of the invention described above.

In some cases, such a program is encrypted or compressed when it is stored in a storage medium or when it is transmitted as a carrier on a network. If so, it is necessary for the information processing apparatus 10 to decrypt or decompress the program that is read out of the storage medium or received as a carrier before execution thereof.

In the exemplary embodiment of the invention described above, the card-access processing is implemented by software. However, the invention is in no case limited to such a configuration. For example, the card-access processing may be implemented by hardware in the form of an application specific IC (ASIC) or the like.

What is claimed is:

1. An information processing apparatus comprising:
   a card slot in which a card-type medium is inserted;
   a first communication speed acquisition section that acquires a first communication speed, which is a communication speed achieved when performing data exchange with the card-type medium in a first operation mode;
   a second communication speed acquisition section that acquires a second communication speed, which is a communication speed achieved when performing data exchange with the card-type medium in a second operation mode;
   an interruption-free maximum data size acquisition section that acquires an interruption-free maximum data size, which is a maximum data size by which data exchange can be performed without causing an interruption, when performing data exchange with the card-type medium in the second operation mode;
   a judgment section that judges which one of the first operation mode and the second operation mode offers a faster data exchange with the card-type medium based on the first communication speed, the second communication speed, and the interruption-free maximum data size; and
   a data communication section that performs data exchange with the card-type medium in the one operation mode that is judged by the judgment section having a faster data exchange with the card-type medium.

2. The information processing apparatus according to claim 1, wherein
   the first communication speed acquisition section acquires the first communication speed when the card-type medium is detected at the card slot;
   the second communication speed acquisition section acquires the second communication speed when the card-type medium is detected at the card slot;
   the interruption-free maximum data size acquisition section acquires the interruption-free maximum data size when the card-type medium is detected at the card slot; and
   the judgment section judges which one of the first operation mode and the second operation mode offers a faster data exchange with the card-type medium when the card-type medium is detected at the card slot.

3. The information processing apparatus according to claim 1, further comprising a plurality of mode selection tables each of which is prepared for a plurality of the interruption-free maximum data sizes that are predetermined for the second operation mode,
- wherein, each of the plurality of mode selection tables shows, in tabular form, which one of the first operation mode and the second operation mode offers a faster data exchange, for each combination of a value of the first communication speed and a value of the second communication speed; and
- the judgment section selects one mode selection table that corresponds to the interruption-free maximum data size of the card-type medium inserted in the card slot among the plurality of mode selection tables, and judges which one of the first operation mode and the second operation mode offers a faster data exchange with the card-type medium while making reference to the selected mode selection table.

4. The information processing apparatus according to claim 1, wherein the card-type medium is a Compact Flash card.

5. The information processing apparatus according to claim 4,
- wherein the first operation mode is a memory mode;
- the second operation mode is a True IDE mode; and
- the interruption-free maximum data size is a maximum number of sectors in said compact flash.

6. A method for controlling an information processing apparatus having a card slot in which a card-type medium is inserted, comprising;
- acquiring a first communication speed, which is a communication speed achieved when performing data exchange with the card-type medium in a first operation mode;
- acquiring a second communication speed, which is a communication speed achieved when performing data exchange with the card-type medium in a second operation mode;
- acquiring an interruption-free maximum data size, which is a maximum data size by which data exchange can be performed without causing an interruption, when performing data exchange with the card-type medium in the second operation mode;
- judging which one of the first operation mode and the second operation mode offers a faster data exchange with the card-type medium based on the first communication speed, the second communication speed, and the interruption-free maximum data size; and
- performing data exchange with the card-type medium in the operation mode that is judged as having a faster data exchange with the card-type medium.

7. A recording medium, having a program for controlling an information processing apparatus having a card slot in which a card-type medium is inserted, the program instructing the information processing apparatus to execute the following;
- acquiring a first communication speed, which is a communication speed achieved when performing data exchange with the card-type medium in a first operation mode;
- acquiring a second communication speed, which is a communication speed achieved when performing data exchange with the card-type medium in a second operation mode;
- acquiring an interruption-free maximum data size, which is a maximum data size by which data exchange can be performed without causing an interruption, when performing data exchange with the card-type medium in the second operation mode;
- judging which one of the first operation mode and the second operation mode offers a faster data exchange with the card-type medium based on the first communication speed, the second communication speed, and the interruption-free maximum data size; and
- performing data exchange with the card-type medium in the one operation mode that is judged as having a faster data exchange with the card-type medium.

8. The information processing apparatus according to claim 3, wherein data exchange is performed in the second operation mode by one of the plurality of interruption-free maximum data sizes.

9. The information processing apparatus according to claim 1, wherein the maximum data size is determined based on a unit of data size that is specified in a communication protocol.

10. The recording medium according to claim 7, wherein said program is distributed from a carrier network.

11. The recording medium according to claim 7, wherein said program is encrypted or compressed.

* * * * *